United States Patent [19]

Howeth

[11] Patent Number: 4,690,700
[45] Date of Patent: Sep. 1, 1987

[54] BACKFLUSHED AIR FILTERS WITH QUICK OPENING MULTIPLE DISCHARGE VALVE

[76] Inventor: D. Franklin Howeth, 233 Chuck Wagon Trail, Fort Worth, Tex. 76108

[21] Appl. No.: 784,872

[22] Filed: Oct. 4, 1985

Related U.S. Application Data

[63] Continuation-in-part of Ser. No. 549,963, Nov. 7, 1983, Pat. No. 4,544,389.

[51] Int. Cl.$^4$ ............................................. B01D 46/04
[52] U.S. Cl. .................................. 55/302; 137/625.48; 251/45
[58] Field of Search .................... 55/96, 293, 302; 137/625.48; 251/43, 45

[56] References Cited

U.S. PATENT DOCUMENTS

| | | | |
|---|---|---|---|
| 2,738,157 | 3/1956 | Vargo | 251/45 X |
| 3,457,893 | 7/1969 | Lavalier | 251/45 X |
| 3,521,430 | 7/1970 | Vanderlip et al. | 251/45 X |
| 3,540,193 | 11/1970 | Pausch | 55/302 |
| 3,757,497 | 9/1973 | Ray | 55/302 |
| 3,757,821 | 9/1973 | Fujiwara | 137/625.48 |
| 3,798,878 | 3/1974 | Pausch | 55/302 X |
| 3,806,081 | 4/1974 | Otto | 251/45 X |
| 3,994,318 | 11/1976 | Ishigaki | 251/45 X |
| 4,179,096 | 12/1979 | Fromfield | 251/45 X |
| 4,208,361 | 6/1980 | Ushijima et al. | 137/625.48 X |
| 4,244,554 | 1/1981 | Di Mauro et al. | 251/45 X |
| 4,359,330 | 11/1982 | Copley | 55/302 X |
| 4,452,616 | 6/1984 | Gillingham et al. | 55/302 |
| 4,486,205 | 12/1984 | Nishiyama | 55/302 |
| 4,544,389 | 10/1985 | Howeth | 55/302 |

Primary Examiner—Robert Spitzer
Attorney, Agent, or Firm—Hubbard, Thurman, Turner & Tucker

[57] ABSTRACT

Pleated paper barrier type air filter elements are cleaned by a reverse air jet cleaning system which includes one or more specifically shaped cleaning air valves in which a plurality of jet nozzles or orifices are arranged in a predetermined pattern to provide a totally enveloping air jet which is discharged into a flow tube immediately downstream of the clean air flow chamber of a generally tubular filter element. The jet pattern provides a temporary pressure seal within the flow tube and entrains a substantial amount of ambient air into the reverse flow jet to thoroughly flush elements to clean dust cake from the exterior surfaces thereof. The multiple jet arrangement reduces the overall space occupied by the reverse jet cleaning system and provides a larger mass flow of cleaning air. Multiple jet orifice valves may be configured in virtually any geometric shape to provide a desired jet pattern.

34 Claims, 10 Drawing Figures

BACKFLUSHED AIR FILTERS WITH QUICK OPENING MULTIPLE DISCHARGE VALVE

CROSS REFERENCE TO RELATED APPLICATION

This application is a continuation-in-part of copending application Ser. No. 549,963 filed Nov. 7, 1983, now U.S. Pat. No. 4,544,389.

BACKGROUND OF THE INVENTION

1. Field of the Invention

The present invention pertains to porous media type air filter units with multiple jet reverse flow cleaning systems for the filter elements wherein a substantial volume of jet cleaning air and entrained ambient air is used to flush the filter elements to remove accumulated dust particles.

2. Description of the Prior Art

The configuration of conventional air filter elements, being a substantially cylindrical annular pleated paper or cloth bag type structure, has resulted in the development of reverse air flow cleaning systems wherein a single jet nozzle is disposed in or somewhat downstream of the inner clean air chamber defined by the filter element and aimed in the opposite direction to that of the clean air flow through the filter element itself.

In one type of system, the jet nozzle is typically adapted to provide a short burst or pulse of pressure air in the range of 80–100 psig for short duration to create a pressure wave which flows through a reduced throat flow venturi and into the bore of the filter element in reverse direction to remove the dust which has accumulated on the surface of the element itself.

However, with high pressure air pulse type reverse flow cleaning systems a relatively inefficient process is carried out and the reverse flow pressure wave unduly stresses the filter media. In order to overcome the problems with such prior art systems certain types of barrier filter elements such as the porous media pleated paper type have been grossly derated as to their filtering capacity to prevent early filter element deterioration and failure due to the reverse pulse jet action. Derating of the element for one such pulse jet system is to a maximum capacity of 1–3 cubic feet per minute of filter air flow per square foot of filter surface area.

In another type of system in the field of self-cleaning air filtration systems, more efficient filter cleaning is accomplished by a reverse air flushing system that is adapted to produce a jet of air discharged from a compressed air reservoir through a quick opening air valve at about 40 to 60 psig. The quick opening air valves operating at this pressure commonly range in discharge orifice size from ¾ inch up to about 2 inches and this means of cleaning permits filter media flow capacities of about 3–5 cubic feet per minute. The discharge orifice of the valve is placed directly over a discharge flow tube placed over the discharge bore of the cylindrical filter and the valve is positioned at a height above the flow tube to allow the air jet emitted by the quick opening valve to expand to strike the bore wall of the tube. The bore of the flow tube may be of lesser or equal size of the filter bore for the purpose of receiving the reverse flushing jet. The jet strikes the wall of the flow tube bore to effect a pressure seal and to provide an eductor effect to draw additional air into the filter bore. The pressure seal effect causes the air to be forced through the filter media to remove the dust cake.

In order for the heretofore existing reverse flushing systems to operate properly, the system designer must plan the relationship of the flushing jet diameter to the flow tube bore diameter so that a proper point of intersection is achieved. Typically, the quick opening valve emits a jet that expands in a cone having a 15 degree to 20 degree included angle and the jet spacing with respect to the flow tube bore is adjusted accordingly Obviously, the larger the filter bore, and thus the flow tube bore, the further the quick opening valve discharge outlet must be placed from the flow tube bore opening. The greater the distance at which the valve is placed from the tube bore opening, the larger the cabinetry becomes that houses the reverse flushing system.

In co-pending U.S. patent application Ser. No. 549,963, filed Nov. 7, 1983, now U.S. Pat. No. 4,544,389, there is disclosed a multiple orificed air jetting device that is attached to a quick opening air discharge valve. This multiple orifice device diffuses a single concentrated air stream into a number of jetting air streams over a larger surface area. Thus, in the case of a round bore filter, the multiple orifices are placed in circular form relative to the flow tube and filter bore size. The flushing system may thus be placed in close proximity to the flow tube bore opening and, accordingly, reduces the height of the cabinetry housing the flushing system.

While the multiple orifice device of co-pending Application Ser. No. 549,963, now U.S. Pat. No. 4,544,389, is extremely effective as a filter reverse flushing system, it tends to generate an energy loss in the compressed air stream between the quick opening valve and the discharge orifices. A loss is encountered as the air stream expands into the multiple orifice supply chamber and is again compressed into the individual orifices. In other words, the velocity of the air stream emitted from the single orifice of the quick opening valve is slowed and then reaccelerated through the orifices.

Additionally, the cabinetry enclosing the multiple orifice filter reverse flushing system can now be reduced to the point that installation of quick opening air discharge valves may be difficult. Presently existing quick opening valves are provided with threaded pipe connections to a pressure fluid supply. Additionally and more importantly, the cabinetry clearance required to rotate the valve as it is being assembled to the supply connection often compromises the potential size reduction of the cabinetry that the multiple orifice device affords.

The aforementioned problem in the art of porous media air filter reverse air cleaning with single jet quick opening air valves and with multiple jet openings in combination with existing single port discharge quick opening air valves, has led to the development of the present invention.

SUMMARY OF THE INVENTION

The present invention provides improved configurations of pleated paper or similar porous media type air filter apparatus and a reverse air multiple jet cleaning system for backflushing the filter elements.

In accordance with one aspect of the present invention there is provided a reverse air flow cleaning system in combination with a porous media air filter unit wherein a multiple jet valve having a plurality of nozzles arranged in a configuration which will provide a reverse flow jet which is in substantial engagement with the peripheral wall of a flow tube downstream of the filter element to create a pressure seal and to entrain a relatively large quantity of ambient air to provide a thorough flushing action to clean accumulated dust and other debris adhering to or caked on the surface of the filter element itself.

In accordance with another aspect of the present invention there is provided a reverse flow cleaning system wherein a multiple jet valve is provided in a head or manifold housing to emit a jet pattern which will substantially envelop the cross-sectional flow area of an irregularly shaped conduit or conduit segment which is provided for conducting clean air away from the interior clean air flow chamber of a porous media barrier type filter element. The multiple jet arrangement is configured to provide pressure air at about 40 to 60 psi in a diverging jet flowstream which will entrain a substantial amount of ambient air to flow in the reverse direction through the filter element to thoroughly flush the element as opposed to shocking or pulsing the element structure. This type of action provides for more thorough cleaning of the element surface and reduces the stress induced on the filter element as compared with the relatively intense high pressure shock wave induced by prior art type reverse jet cleaning systems. Accordingly, in the case of the porous pleated paper type elements, for example, the filter capacity can be uprated to a range of at least 4–5 cubic feet of air flow per minute per square foot of filter area.

In accordance with another aspect of the present invention there is provided a reverse multiple jet cleaning valve for an air filter element which is configured to minimize the space occupied by the reverse jet cleaning system providing a filter discharge flow conduit or tube downstream of the filter element which is as large as the cross-sectional flow area of the filter bore.

In accordance with yet a further aspect of the present invention, there is provided a high flow, two-way, pilot operated air flow valve having a single bolted flange pressure fluid inlet and multiple fluid outlet nozzles with means for substantially simultaneously opening the outlet nozzles to achieve a shaped jet of pressurized air. Additionally, the present invention provides an air flow valve wherein the pressure fluid inlet chamber and multiple orifice outlet chamber are one and the same, thus to minimize the number of changes in air flow stream velocity thereby to utilize the air stream energy most efficiently.

The advantages derived from the present invention include the provision of a self-cleaning filter unit having a relatively large filter bore discharge area for a given overall dimensional envelope or bulk. The improved multiple jet nozzle energy utilization and its relationship to the air flow structure downstream of the filter element also provides for entraining a larger volume of so called ambient air with the reverse flow jet to more thoroughly flush or flood the filter element which will assure more thorough cleaning of the element. The air flow rate through the filter elements may be increased as compared with prior art derated filter elements without decreasing filter element service life. Lower reverse jet air pressures are required thereby reducing energy requirements and stress levels on the filter elements.

The aforementioned aspects of the present invention together with other superior features will be appreciated by those skilled in the art upon reading the detailed description which follows.

DESCRIPTION OF THE PREFERED EMBODIMENTS

Figure 1:
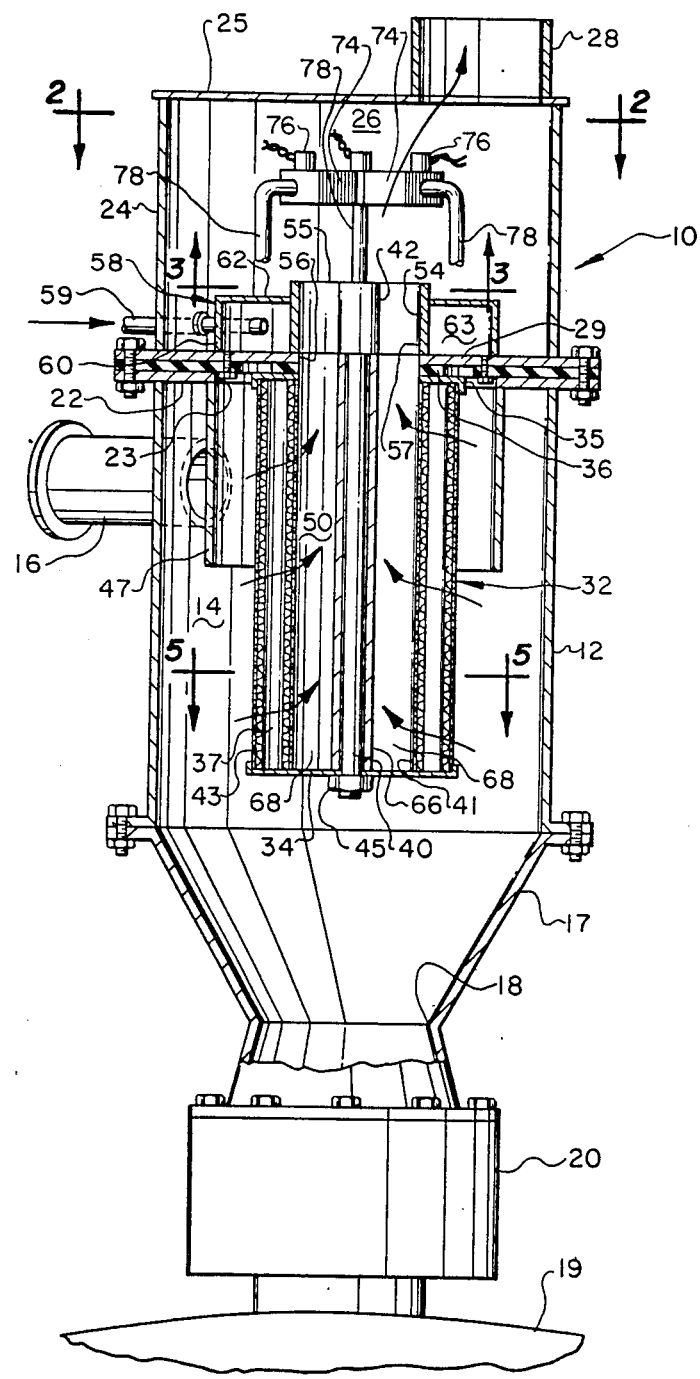
FIG. 1 is a vertical longitudinal section view of an air filter unit including the multiple jet reverse flow cleaing system of the present invention.

Referring to FIG. 1, there is illustrated an air filter unit 10 including a substantially cylindrical filter housing 12 having an interior chamber 14 into which dust laden air is introduced by way of an inlet conduit 16. The housing 12 includes a lower section 17 having a bottom dust discharge opening 18 which may be in communication to a dust receiver tank 19 by way of a valve device 20. Periodically, the valve 20 is opened to dischage a quantity of accumulated dust into the tank 10. The housing 12 includes a transverse endwall 22 at the opposite end from the dust discharge opening 18 and a clean air discharge housing or shroud 24 suitable mounted on top of and secured to the endwall 22 and forming a clean air discharge chamber 26. The housing 24 includes a top wall 25 which is suitably removable from the remainder of the housing to provide access to the chamber 26. Clean air exiting from the filter unit 10 flows through a clean air discharge conduit 28 to atmosphere or to other suitable conduit means, not shown, depending on the application of the filter unit.

Figure 5:
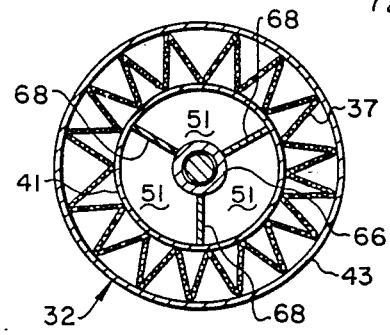
FIG. 5 is a section view taken along line 5—5 of FIG. 1.

Referring to FIG. 5 also, the filter unit 10 is of a type which utilizes a porous media or so called barrier type filter element, 32. The filter element 32 may be constructed in accordance with one of several known techniques and preferably comprises a generally cylindrical tubular pleated paper member 37, or a fabric tube, not shown, supported by suitable reinforcing structure. The filter element 32 includes a bottom wall 34 and an opposed top wall 35, both of which may be separate from the element itself or form an integral part thereof. The filter element 32 is supported in sealing engagement with a transverse endwall 29 by way of a cylindrical ring gasket 36 disposed between the top wall 35 and the endwall 29 to form a fluid-tight seal.

The filter element 32 is adapted to be supported within the chamber 14 by suitable means such as, for example, an elongated tie rod 40 integrally formed with a hub part 42 supported on the housing section 24. The rod 40 extends through the bottom wall 34 and is threadedly engaged with a nut 45. The filter element 32 may be installed in the chamber 14 by first removing the housing section 12 from the housing section 17, for example, or by removing the housing section 24 from the housing section 12. The interior chamber 14 is also provided with a dust deflecting shield 47 extending downward from endwall 22 and disposed around an opening 23 in the endwall. The shield 47 is also disposed around an upper portion of the filter element 32 to prevent short circuit flow of dust laden air from the inlet conduit 16 directly into contact with the surface of the filter element. The filter element 32 operates to filter air flowing from the chamber 14 into an interior clean air chamber 50 for exit from the filter unit 10 in accordance with the flow arrows shown in FIG. 1 wherein air flows basically from the chamber 14, through the porous media of the filter element 32, into the chamber 50, then into the chamber 26 and out through the discharge conduit 28.

The filter element 32 functions to remove solid particles from the air flowing through the element by impingement of the particles on the outer surface of the element media. The media for the element 32 is shown as the pleated paper cylinder 37, for example. The paper cylinder 37 is preferably supported by inner and outer cylindrical screenlike members 41 and 43. Dust particles typically accumulate on the exterior of the paper cylinder 37 until a substantially solid layer or cake is formed which must be removed to allow the filter element to continue its function and to prevent a pressure differential between the chambers 14 and 50 which might result in the collapse of the filter element. It has been determined that, by providing a momentary reverse flow of relatively high pressure air in a jet or pulse type action, at least some of the accumulated dust may be forcibly removed from the filter element 32 and allowed to fall to the bottom of the housing 12 for discharge through the opening 18.

In accordance with prior art practice the reverse flow jet has been provided by mounting a nozzle substantially coaxial with the longitudinal axis or centerline of the filter element 32 and above, for example, the chamber 50. The aforedescribed prior art nozzle is suitably connected to a source of high pressure air by way of a power operated valve which is momentarily opened and closed to allow a pulse of high pressure air to flow reversely through the chamber 50 and to create a pressure wave in an effort to dislodge the aforementioned dust cake and clean the filter element. This prior art type of reverse jet cleaning apparatus requires a relatively constricted filtered air discharge flow tube for conducting clean air from the chamber 50. The aforementioned type of flow tube forms an undesirable flow restriction in the flow path of air being cleaned to thereby dictate higher power requirements for the filtered air in forced flow systems. Moreover, prior art arrangements of reverse flow jet nozzles have also necessitated a relatively large housing part 24 and comparable to the size of the housing section 12 thereby having an overall height which undesirably increases the space occupied by the filter unit.

However, in accordance with the present invention a substantially improved jet nozzle flushing filter element cleaning system has been developed by providing multiple jets of pressure air arranged in such a way as to expand preferably into contact with the peripheral walls of a clean air discharge flow conduit downstream of the chamber 50 in the direction of flow of clean air out of the filter unit. Thanks to the relatively large surface area formed between the multiple jets and the "ambient" air in the chamber 26 the improved jet nozzle configuration provides for entraining a relatively large amount of this ambient air to flow reversely through the chamber 50 and into the chamber 14 to thoroughly flood the filter element 32 and thereby remove substantially all of the dust or accumulated particulate matter on the outer surface of the element.

Figure 2:
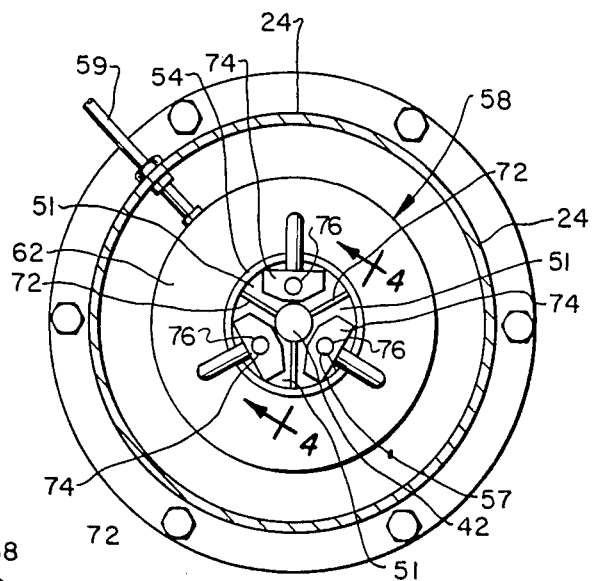
FIG. 2 is a section view taken substantially from the line 2—2 of FIG. 1.

Referring further to FIGS. 1 and 2, the reverse jet filter cleaning system includes a relatively large diameter flow tube 54 extending from an opening 56 in the endwall 29 vertically upward a relatively short distance to an end face 55. The flow tube 54 is of a diameter such that an inner wall surface or bore 57 forms a passage of approximately the same flow area as the chamber 50 defined by the inner diameter of the filter element 32. The flow tube 54 is surrounded by a cylindrical annular reverse jet air supply manifold 58 including a sidewall 60, a top wall 62, a portion of the endwall 29 and a portion of the flow tube 54 to form an annular manifold chamber 63. Pressure air may be supplied to the manifold 58 by a conduit 59 extending through the outer sidewall of housing 24 as shown in FIG. 2. Referring to FIG. 5, also, the chamber 50 is divided into a plurality of subchambers 51 by a divider structure comprising a central tubular member 66 disposed around the rod 40 and three radially extending partition plates 68 which project outward and are substantially contiguous with the inner sidewall 41 of the filter element 32.

Figure 3:
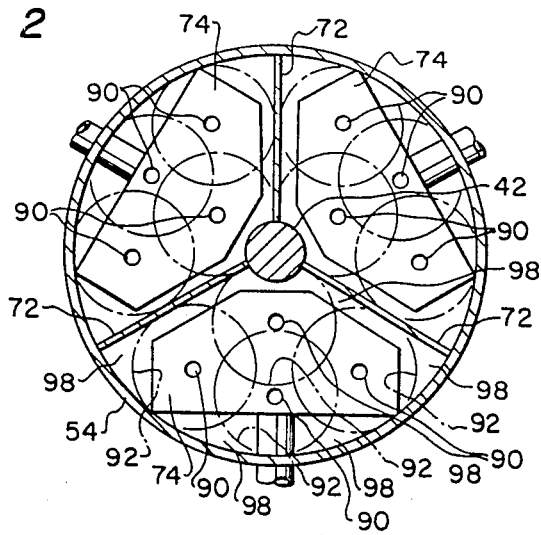
FIG. 3 is a detail section view on a larger scale and taken from line 3—3 of FIG. 1.

The divider structure includes a portion which is formed in the flow tube 54 and comprises three circumferentially spaced apart radially projecting partition plates 72, FIG. 3, aligned with the respective plates 68. The plates 72 are suitably joined to and project outward from the hub part 42. The portion of the divider structure comprising the tube 66 and plates 68 may be formed integral with the hub part 42 and plates 72. Although the chamber 50 and the interior of the flow tube 54 are thus divided into three aligned subchambers, those skilled in the art will appreciate from the description herein that the chamber 50 may be divided into fewer or greater numbers of subchambers by a similar type of divider structure.

Figure 6:
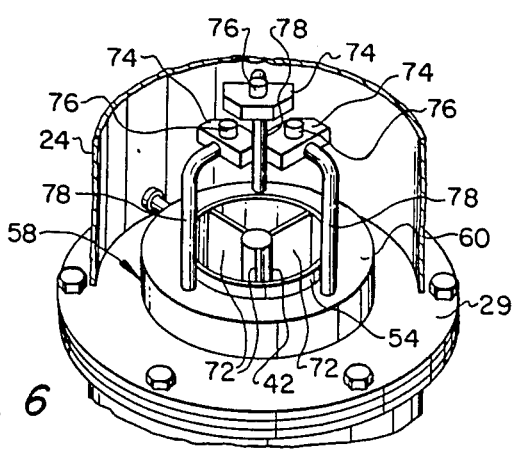
FIG. 6 is a detail perspective view of the reverse jet supply and discharge manifold arrangement.

As shown in FIGS. 1, 2 and 3, the reverse flow filter cleaning system is further characterized by an arrangement of three quick opening cleaning air jet discharge valves 74 which are disposed directly above the flow chambers 51, respectively, and are each connected to a pilot operating valve 76. Each of the conduits 78 comprises a substantially rigid conventional metal pipe or tube which is suitably supported on the supply manifold top wall 60, as shown in FIG. 6, and supports the respective valves 74 which are mounted in cnatilever fashion extending directly above the subchambers 51. The valves 74 are each adapted to be opened and closed in timed relationship to each other by way of a suitable control unit, not shown. Suffice it to say that the aforementioned control unit may be adapted to provide for opening and closing the respective valves 74 in a predetermined sequence for a predetermined duration for allowing high pressure air to flow from the manifold 58.

Figure 4:
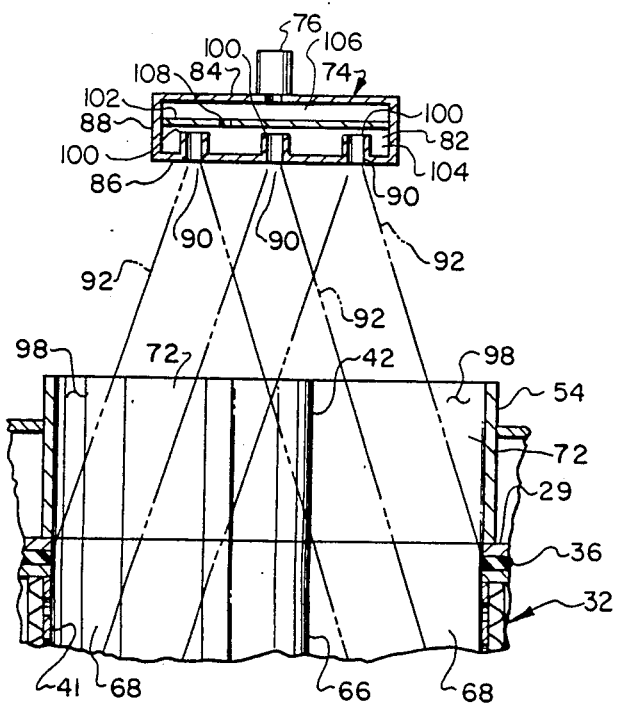
FIG. 4 is a detail section view taken along line 4—4 of FIG. 2.

Referring now to FIGS. 3 and 4, in particular, each of the air discharge valves 74 is characterized as a shaped valve body having an interior chamber 82 delimited by top and bottom walls 84 and 86 and a peripheral sidewall 88. The bottom wall 86 has a plurality of relatively sharp edged nozzles or orifices 90 formed therein in a predetermined pattern to develop a plurality of overlapping frusto-conical jets, indicated schematically in FIG. 4 and designated by the numerals 92. The specific configuration of the jets 92 is a cone with included angle of about 15 to 20 degrees and comprises a diverging flow of high velocity pressure air. The jets 92 have fairly well defined conical shapes which extend in overlapping relationship to each other and which diverge until they contact the wall surfaces of the partition plates 72 and the interior wall surface 57 of flow tube 54. The boundaries of the jets 92 which are designated by the conical line. The air flow within the generally conical envelope defining the jets 92 is of very high velocity and therefore tends to entrain the relatively stationary or ambient air outside of the jet boundary. This entrainment adds substantially to the mass of air being directed into the subchambers 51 to flow out through the filter element 32.

Referring particulary to FIG. 4, each nozzle of valve 74 includes an upstanding nozzle body that defines a seat 100 within chamber 82. Each seat 100 is adapted to be simultaneously opened and closed by a valve member 102, which is movably sealingly positioned in valve 74 to divide chamber 82 into a primary chamber 104 and a pilot chamber 106. Pressurized air in primary chamber 104 is communicated to pilot chamber 106 through an orifice 108 formed in valve member 102. The communication of pressure air through orifice 108 tends to equalize pressure in chambers 104 and 106. The pressure tends to maintain valve member 102 in a normally closed position due to the decreased area of pressure action caused by the sealing engagement of valve member 102 with seats 100. When pilot valve 76 is opened, the pressures in chambers 104 and 106 become unbalanced and cause valve member 102 to open substantially simultaneously each nozzle 90.

In accordance with an important aspect of the present invention it has been determined that an optimum location of the cleaning air discharge valves 74 is such as to produce jets 92 which impinge the interior wall surface of the flow tube 54 and the plates 72 just above or at the juncture of the flow tube with respect to the filter element 32. The point of contact of the jets 92 with the flow tube 54 may be further along the tube toward its discharge end but the air entrainment capability of the jets increases with their placement as shown. In the arrangement illustrated, the flow tube 54 actually does not in itself extend to a point contiguous with the filter element 32 but the openings in the endwalls 22 and 29 and the gasket 36 effectively form an extension of the flow tube. For purposes of discussion herein the term downstream as used throughout the specifications and claims refers to the direction of normal flow of air to be cleaned through the filter system as previously described. By positioning the manifolds or heads 74 so that the reverse flow cleaning air jets are contiguous with the walls of the flow tube 54 and the plates 72 at or slightly downstream of the juncture of the flow tube with the filter element 32 a "seal" is provided which prevents air from flowing around the periphery of the jets and along the interior sidewalls of the flow tube toward the chamber 26 during discharge of the jets 92.

Moreover, the generally triangular shaped areas 98 formed around the portions of the subchambers 51 delimited by the overlapping jets 92 and the walls of the flow tube 54 and the partition plates 72 increases the area available for entrainment of ambient air with the jetted air to increase the mass flow of cleaning air which is forced to flow reversely through the filter element 32. Those skilled in the art will appreciate that the configuration of the nozzles or orifices 90 and their specific pattern will not necessarily form a precisely defined jet having a cross-sectional area corresponding exactly to the cross-sectional area of the flow path of the jet. However, as the jets 92 diverge into contact with the inner wall surface of flow tube 54 and the surfaces of the plates 72, for example, the configuration of the jets will be deflected or deformed somewhat as they contact these surfaces so that, at a point just downstream of the juncture of the flow tube 54 with the filter element 32, the air flow throughout the cross-sectional area is virtually totally in a direction opposite to that of the normal flow of air being cleaned through the flow tube.

One important advantage of the multiple jet arrangement for reverse flow cleaning air is that the manifolds or heads 74 may be disposed closer to the top of the flow tube 54 than with prior art single orifice reverse flow air jet systems. Moreover, the provision of multiple reverse flow jets increases the overall surface area or interface between the fast moving jet flow of air and the relatively stationary ambient air to increase the amount of ambient air entrained with the propulsion or jetted air. Another advantage derived from the arrangement described herein is that the flow tube 54 bore may be made as large in cross-sectional flow area as the bore of the filter, thereby reducing the pressure drop or resistance to flow of the air being cleaned as it flows through the filter element 32 and from the chamber 50 into the chamber 26. Although it is assumed that the jets 92 diverge in such a way as to form a cone having an included angle of approximately 18 degrees, the geometrical shape of the nozzles or orifices 90 and the geometrical arrangement of the orifices and the distance of travel of the jetting stream from point of discharge from the nozzle 90 to contact inner wall of the flow tube bore 54 and surface of plate 72 will determine the specific shape of the jets as they diverge to seal the flow tube opening 54.

The operation of the multiple jet reverse flow cleaning system described herein in conjunction with FIGS. 1 through 6 is believed to be readily understandable from the foregoing description. However, briefly, the system is operated by timed opening and closing of the respective pilot valves 76 to emit relatively large volumes of pressure air at pressures in the range of 15 to 60 psig for discharge from the supply manifold 58 into the respective jet discharge valves 74. The duration of the open condition of the respective valves 76 is controlled to assure that a substantial flushing or flooding action of the reverse flow cleaning air is carried out as opposed to the quick pulse or shock type action provided by prior art type reverse air flow filter cleaning systems. Moreover, the nominal pressures of the jet cleaning air are preferably 20 to 40 psig which is significantly less than that required by prior art systems.

In accordance with another important aspect of the invention provided by the multiple jet discharge manifolds 74, the specific configuration of the filter element and the reverse flow jet itself may be varied. The filter element itself may be virtually any shape and may be a substantially planar member, for example, as long as a barrier is formed between the clean air chamber and the contaminant side or chamber.

Figure 7:
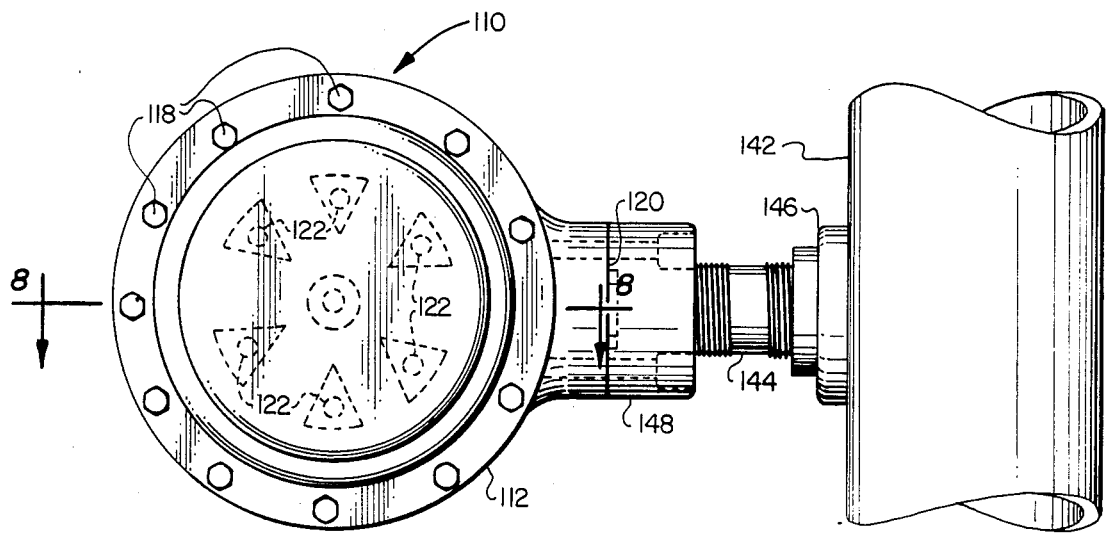
FIG. 7 is a top view of a preferred embodiment of the quick opening multiple jet discharge valve of the present invention.
Figure 8:
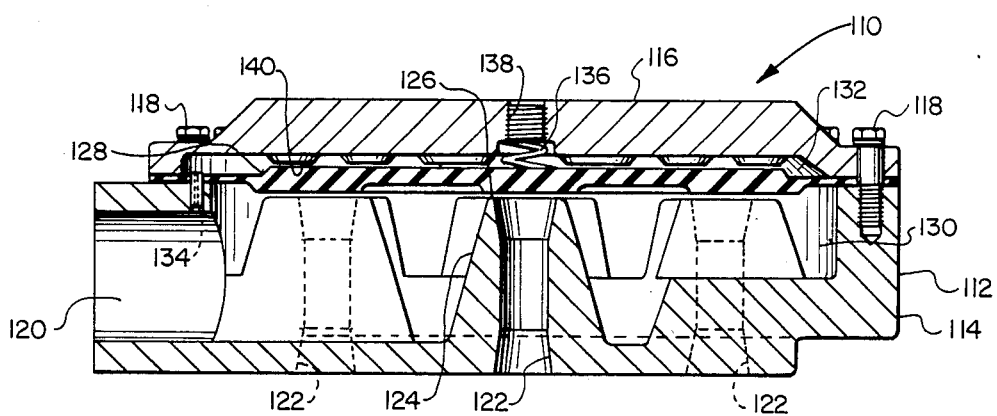
FIG. 8 is a section view taken from the line 8—8 of FIG. 7.

Referring now to FIGS. 7 and 8, there is shown a quick opening multiple jet discharge valve designed generally by the numeral 110 that is particularly adapted to cleaning cylindrical nonsegmented bore filters. Valve 110 includes a valve body 112 which includes a main body 114 and a pilot air dome 116. Pilot air dome 116 is sealingly connected to main body 114 by suitable fasteners, as for example, by screws 118.

Main body 114 of valve body 112 includes an inlet 120 and a plurality of nozzle outlets 122 positioned to discharge appropriately shaped jets of pressure air. Each nozzle outlet 122 includes a tubular portion 124 having a valve seat 126.

A flexible diaphragm 128 is sealingly positioned between pilot air dome 116 and main body 114 to divide valve body 112 into a primary chamber 130 and a pilot chamber 132. Pressure within primary chamber 130 is communicated to pilot chamber 132 through an orifice 134 positioned adjacent inlet 120. A spring 136 is provided to normally urge flexible diaphragm 128 into sealing engagement with outlet nozzle valve seats 126. When flexible diaphragm 128 is in the closed position, and the pressures in primary chamber 130 and pilot chamber 132 are equalized by means of orifice 134, an unbalanced force is created upon flexible diaphragm 128 to urge and hold it in sealing engagement with seats 126. A pilot discharge port 138 is provided in pilot dome 116 to open in response to the opening of a pilot valve (not shown) to vent pilot chamber 132. The venting of pilot chamber 132 causes the forces on flexible diaphragm 128 to become unbalanced and allows flexible diaphragm 128 to move out of sealing engagement with outlet nozzle valve seats 126. The movement of flexible diaphragm 128 causes substantially simultaneous opening of each nozzle outlet, thereby to produce a shaped jet of air. After discharge of the jet, the pilot valve (not shown) is closed and flexible diaphragm 128 returns to the closed position. Flexible diaphragm 128 may include wear resistant means engageable with valve seats 126. Pilot air dome 116 may include a plurality of projections 140 for engaging flexible diaphragm 128 in the open position to allow for free flow of pilot air within pilot chamber 132.

Valve 110 is adapted to receive a supply of pressure air from a manifold or the like 142. Valve 110 is connected to manifold 142 by means of a pipe nipple connected to manifold 142 by a suitable fitting 146. Valve 110 is preferably connected to pipe nipple 144 by means of a bolted flange connection 148. flange connection 148 is preferably a Society of Automotive Engineers Standard No. SAE-J518C. Bolted flange connection 148 allows valve 110 to be mounted without rotation.

Figure 9:
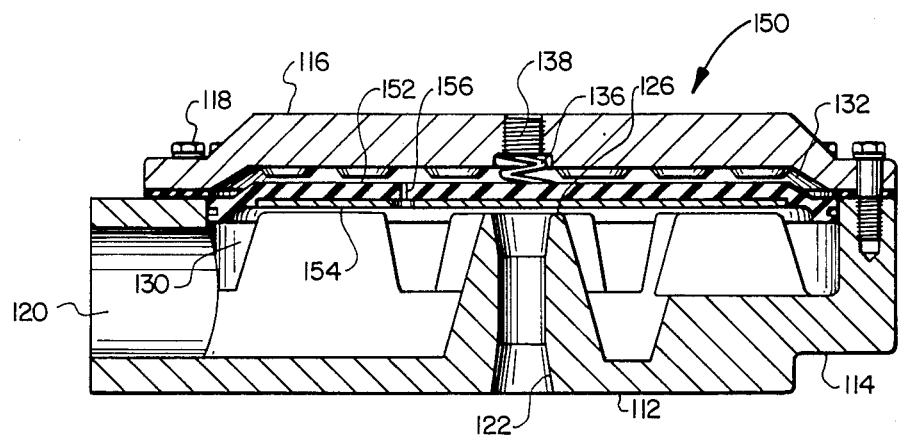
FIG. 9 is a sectional view of an alternative embodiment of the quick opening multiple jet discharge valve of the present invention; and, FIG. 10 is a sectional view of a further alternative embodiment of the quick opening multiple jet discharge valve of the present invention.

Referring now to FIG. 9, there is shown an alternative embodiment of the valve of the present invention, which is designated generally by the numeral 150. Valve 150 is substantially similar to valve 110. Valve 150 includes a valve body 112 having a main body 114 and a pilot air dome 116 sealingly connected thereto by means of a plurality of bolts 118. Main body 114 incudes an inlet 120 and a plurality of nozzle outlets 122. Each nozzle outlet 122 includes a valve seat 126.

Valve 150 differs from valve 110 in that in place of flexible diaphragm 128, valve 150 includes as its valve member a disc-like piston 152 slidingly sealingly disposed in main body 114 to divide valve body 112 into a primary chamber 130 and a pilot chamber 132. Piston 152 includes a wear resistant sealing face 154 adapted to sealingly engage outlet nozzle seats 126. Piston 122 includes an orifice 156 for communicating pressure from primary chamber 130 to secondary chamber 132. When pilot chamber 132 is vented through pilot port 138, piston 152 moves to the open position, a spring 136 is provided for normally urging piston 152 toward the closed position.

Figure 10:
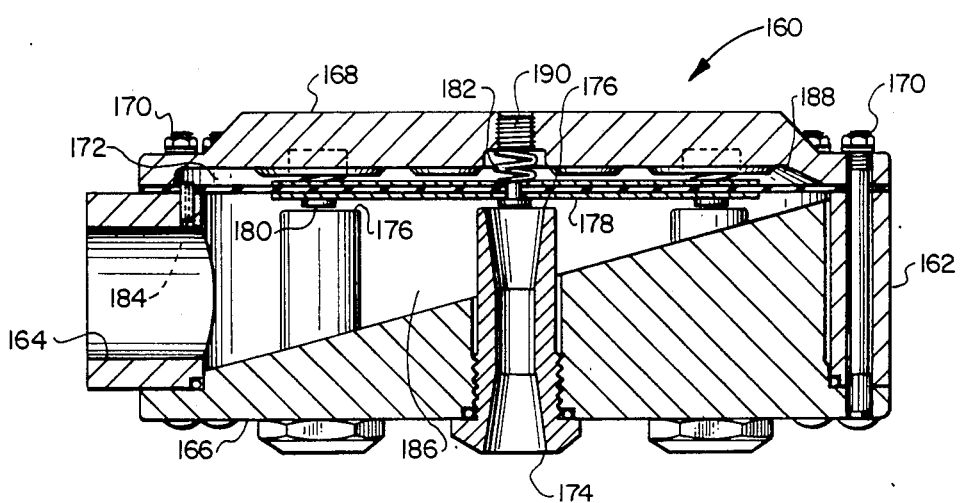

Referring finally to FIG. 10, there is shown yet a further alternative embodiment of the valve of the present invention, which further alternative is designated generally by the numeral 160. Valve 160 includes an annular vavle body 162 having an inlet 164. Valve body 162 has an open lower end which is sealingly closed by a floor member 166. The upper end of body 162 is closed by a pilot pressure dome 168. Pilot pressure dome 168 and floor member 166 are connected together through body 162 by means of a plurality of bolts 170. A flexible diaphragm 172 is sealingly positioned between pilot air dome 168 and body 162. A plurality of nozzle outlets are threadedly engaged with floor member 166 and are engageable with flexible diaphragm 172 when valves 160 is in the closed position. Each outlet nozzle 174 includes a tubular portion defining a seat 176. A wear resistant plate 178 is connected to flexible diaphragm 172 by means of rivets 180 or the like. A plurality of springs 182 are provided for normally urging flexible diaphragm 172 into sealing engagement with seats 176.

Valve 160 includes an orifice 184 for communicating pressure between the primary chamber 186 and the pilot chamber 188. When pilot chamber 188 is vented through a pilot port 190, flexible diaphragm 172 moves out of sealing engagement with seats 176, thereby to open valve 160. While in the illustrated embodiments, pressure has been equalized between primary chamber 186 and pilot chamber 188 by means of orifice means, alternative means may be utilized. For example, orifice 184 may be eliminated and a three-way block and bleed valve may be connected to pilot port 190. The three-way block and bleed valve (not shown) would be adapted under one condition to supply pressure through pilot port 190 to hold flexible diahragm 172 closed but upon an appropriate signal, to vent pilot chamber 188, thereby to allow valve 160 to open.

Further modifications and alternative embodiments of the apparatus of this invention will be apparent to those skilled in the art in view of this description. Accordingly, this description is to be construed as illustrative only and is for the purpose of teaching those skilled in the art the manner of carrying out the invention. It is to be understood that the form of the invention herewith shown and described is to be taken as the presently preferred embodiment. Various changes may be made in the shape, size, and arrangement of parts. For example, equivalent elements or materials may be substituted for those illustrated and described herein, parts may be reversed, and ceratin features of the invention may be utilized independently of the use of other features, all as would be apparent to one skilled in the art after having the benefit of this description of the invention.

What is claimed is:

1. A quick opening multiple jet discharge valve, which comprises:
a valve body including a main body having an inlet and a plurality of outlet nozzles arranged in a predetermined pattern so as to form overlapping jets of gas which expand to form a flow stream, each of said outlet nozzles having a valve seat interior of said valve body and an outlet exposed to ambient pressure exterior of said valve body, and a pilot pressure dome connected to said main body.

a valve member sealing positioned within said valve body between said pilot pressure dome and said outlet nozzle valve seats to divide said valve body into a primary chamber for receiving pressurized gas from said inlet and containing said outlet nozzle valve seats, and a pilot chamber, said valve member being movable between a closed position in engagement with said outlet nozzle valve seats and an open position;

means for introducing pressurized gas into said pilot chamber to balance the pressure in said pilot chamber to equal the pressure in said primary chamber, thereby to urge said valve member into sealing engagement with said outlet nozzle valve seats to hold said valve member in said closed position.

and means for venting said pilot chamber to permit pressure in said primary chamber to move said valve member to said open position out of sealing engagement with said outlet nozzle valve seats, thereby to produce a quick exhaust of gas from said nozzles to produce a plurality of overlapping expanding jets of gas.

2. The valve as claimed in claim 1, wherein said pressurized gas introducing means includes orifice means for communicating pressure from said primary chamber to said pilot chamber.

3. The valve as claimed in claim 2, wherein said orifice means is formed in said valve member.

4. The valve as claimed in claim 1, including spring means for biasing said valve member toward said closed position.

5. The valve as claimed in claim 1, wherein said valve member includes a flexible diaphragm sealingly connected between said main body and said pilot dome.

6. The valve as claimed in claim 5, wherein said diaphragm includes wear resistant means for engaging said outlet nozzle valve seats.

7. The valve as claimed in claim 5, wherein said pressurized gas introducing means includes orifice means for communicating pressure from said primary chamber to said pilot chamber.

8. The valve as claimed in claim 1, wherein said valve member includes a piston slidingly sealingly positioned within said valve body.

9. The valve as claimed in claim 8, wherein said piston includes wear resistant means for engaging said outlet nozzle valve seats.

10. The valve as claimed in claim 9, wherein said pressurized gas introducing means includes orifice means for communicating pressure from said primary chamber to said pilot chamber.

11. The valve as claimed in claim 10, wherein said orifice means includes an orifice port formed in said piston.

12. The valve as claimed in claim 1, wherein said pressurized gas introducing means includes an orifice port formed in said valve member to communicate pressure from said primary chamber to said pilot chamber.

13. The valve as claimed in claim 1, wherein each of said outlet nozzles includes a nozzle member removably connected to said main body.

14. The valve as claimed in claim 1, wherein the volume of said primary chamber decreases with distance away from said inlet.

15. The valve as claimed in claim 1, including bolted flange means for connecting said valve body to a pressure fluid supply line.

16. A porous media barrier type air filter unit, said filter unit including:
a housing forming a filter chamber including means for conducting dust laden air into said chamber;
a porous media barrier filter element in said filter chamber, said filter element defining at least in part a clean air chamber for receiving air which has flowed through said filter element;
means for supporting said filter element in said filter chamber;
means forming a flow tube opening into said clean air chamber for conducting clean air from said clean air chamber and away from said filter element;
reverse flow air jet valve means disposed downstream of said filter element with respect to the direction of flow of clean air through said filter element, said valve means being in communication with a source of pressure air discharging in a predetermined pattern of multiple overlapping expanding frusto-conical jets forming a shaped jet of pressure air for contact with substantially the entire periphery of the walls of said flow tube, said valve means being arranged in such a way as to generate a jet having a cross sectional shape conforming to the cross sectional shape of said flow tube and for inducting a relatively large volume of substantially ambient pressure air into said flow tube in a direction opposite to the direction of flow of clean air out of said clean air chamber to backflush said filter element with a quantity of combined induced and jetted pressure air.

17. The filter unit as claimed in claim 16, including a divider structure disposed in said clean air chamber and including means for partitioning said clean air chamber into a plurality of separate subchambers.

18. The filter unit as claimed in claim 16, wherein said valve means includes:
a valve body including a main body having an inlet and a plurality of outlet nozzles, each of said outlet nozzles having a valve seat, and a pilot pressure dome connected to said main body;
a valve member sealing positioned within said valve body between said pilot pressure dome and said outlet nozzle valve seats to divide said valve body into a primary chamber containing said outlet nozzle valve seats and a pilot chamber, said valve member being movable between a closed position in engagement with said outlet nozzle valve seats and an open position;
means for introducing pressurized gas into said pilot chamber to urge said valve member into sealing engagement with said outlet nozzle valve seats to hold said valve member in said closed position;
and means for venting said pilot pilot chamber to permit said valve member to move to said open position out of sealing engagement with said outlet nozzle valve seats.

19. The filter unit as claimed in claim 18, wherein said pressurized gas introducing means includes orifice means for communicating pressure from said primary chambers to said pilot chambers.

20. The filter unit as claimed in claim 19, wherein said orifice means is formed in said valve members.

21. The filter unit as claimed in claim 18, including spring means for biasing said valve member toward said closed position.

22. The filter unit as claimed in claim 18, wherein said valve member includes a flexible diaphragm sealingly connected between said main body and said pilot dome.

23. The filter unit as claimed in claim 22, wherein said diaphragm includes wear resistant means for engaging said outlet nozzle valve seats.

24. The filter unit as claimed in claim 22, wherein said pressurized gas introducing means includes orifice means for communicating pressure from said primary chamber to said pilot chamber.

25. The filter unit valve as claimed in claim 18, wherein said valve member includes a piston slidingly sealingly positioned within said valve body.

26. The filter unit as claimed in claim 25, wherein said piston includes wear resistant means for engaging said outlet nozzle valve seats.

27. The filter unit as claimed in claim 26, wherein said pressurized gas introducing means includes orifice means for communicating pressure from said primary chamber to said pilot chamber.

28. The filter unit as claimed in claim 27, wherein said orifice means includes an orifice port formed in said piston.

29. The filter unit as claimed in claim 18, wherein said pressurized gas introducing means includes an orifice port formed in said valve member to communicate pressure from said primary chamber to said pilot chamber.

30. The filter unit as claimed in claim 18, wherein each of said outlet nozzles includes a nozzle member removably connected to said main body.

31. The filter unit as claimed in claim 18, wherein the volume of said primary chamber decreases with distance away from said inlet.

32. The filter unit as claimed in claim 18, including bolted flange means for connecting said valve body to a pressure fluid supply line.

33. The filter unit as claimed in claim 18, wherein the total flow area of said outlet nozzles is substantially equal to the flow area of said inlet.

34. A quick opening multiple jet discharge valve, which comprises:

a valve body including a main body having an inlet and a plurality of outlet nozzles arranged in a predetermined pattern so as to form overlapping jets of gas which expand to form a flow stream, each of said nozzles having an outlet exosed to ambient pressure exterior of said valve body, and a pilot pressure dome connected to said main body;

a valve member sealing positioned within said valve body between said pilot pressure dome and said outlet nozzles to divide said valve body into a primary chamber for receiving pressurized gas from said inlet containing said outlet nozzles and a pilot chamber, said valve member being movable between a position to close outlet nozzles and an open positon;

means for introducing pressurized gas into said pilot chamber to balance the pressure in said pilot chamber to equal the pressure in said primary chamber, thereby to urge said valve member to close said outlet nozzles and hold said valve member in said closed position;

and means for venting said pilot chamber to permit said valve member to move to said open position, thereby to produce a quick exhaust of gas from said nozzles to produce a plurality of overlapping expanding jets of gas.

* * * * *